United States Patent Office 3,374,225
Patented Mar. 19, 1968

3,374,225
AMINOBENZODIAZEPINE COMPOUNDS
AND METHODS
Earl Reeder, Nutley, Arthur Stempel, Teaneck, and Leo
Henryk Sternbach, Upper Montclair, N.J., assignors to
Hoffmann-La Roche Inc., Nutley, N.J., a corporation
of New Jersey
No Drawing. Continuation-in-part of application Ser. No.
240,750, Nov. 28, 1962. This application Mar. 28, 1963,
Ser. No. 268,553
8 Claims. (Cl. 260—239)

The instant application is a continuation-in-part of our application Ser. No. 240,750, filed Nov. 28, 1962, now Patent No. 3,340,253, and is also a continuation-in-part of our application Ser. No. 178,551, filed Mar. 9, 1962, and now abandoned.

This invention relates to novel heterocyclic compounds and methods for their preparation. More particularly, the invention relates to 2-amino-5-phenyl-3H-1,4-benzodiazepines bearing a hyroxy group or substituted hyroxy group in the 3-position. Thus, the novel compounds of this invention are selected from the group consisting of those of the formula

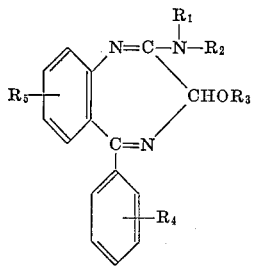

and their pharmaceutically acceptable salts, wherein $R_1$ is selected from the group consisting of hydrogen, lower alkanoyl, and ar-lower alkanoyl; $R_2$ is selected from the group consisting of hydrogen and lower alkyl; $R_3$ is selected from the group consisting of hydrogen, lower alkyl, lower alkanoyl, aroyl and ar-lower alkanoyl; $R_4$ is selected from the group consisting of hydrogen, halogen, lower alkoxy and trifluoromethyl; and $R_5$ is selected from the group consisting of hydrogen, halogen, trifluoromethyl, nitro, lower alkylthio and lower alkyl.

The term "lower alkyl" includes both straight and branced chain groups such as methyl, ethyl, propyl, isopropyl, and the like. Similarly, the term "lower alkoxy" refers to groups such as methoxy and the like. The term "lower alkenyl" refers to both straight and branched chain unsaturated hydrocarbon groups such as allyl and the like. The term "lower alkanoyl" refers to both straight and branched chain aliphatic carboxylic acid groups such as acetyl, propionyl, butyryl, isovaleroyl, and the like. Similarly, the term "aroyl" refers to groups such as benzoyl and the like.

The compounds of Formula I above form pharmaceutically acceptable acid addition salts with both inorganic and organic pharmaceutically acceptable acids, such as hydrochloric acid, hydrobromic acid, nitric acid, sulfuric acid, phosphoric acid, citric acid, formic acid, acetic acid, succinic acid, maleic acid, methanesulfonic acid, p-toluene-sulfonic acid, and the like. Such acid addition salts are also within the scope of the invention.

Compounds of Formula I above, wherein $R_3$ is lower alkanoyl, aroyl or ar-lower alkanoyl can be prepared by reacting a compound of the formula

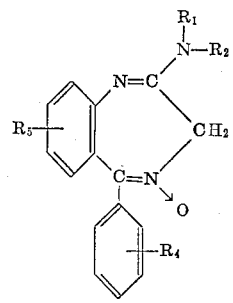

wherein $R_1$, $R_2$, $R_4$ and $R_5$ have the same meanings as above, with an acid anhydride, diacyl sulfide or acid halide. Via this procedure, the 4-position oxygen is split off and the 3-position carbon atom is concurrently acyloxylated. The acid anhydride, diacyl sulfide or acid halide (chlorides are preferred) used should, of course, be the one which would yield the desired lower alkanoyl, aroyl or ar-lower alkanoyl group ($R_3$ in Formula I above). Thus, if it is desired to prepare a compound wherein $R_3$ is acetyl, either acetic anhydride, diacetyl sulfide, or acetyl chloride can be used as the acylating agent. Thus, the acylating agents are selected from the group of lower alkanoyl anhydride, aroyl anhydride, ar-lower alkanoyl anhydride, di-lower alkanoyl sulfide, diaroyl sulfide, diar-lower alkanoyl sulfide, lower alkanoyl halide, aroyl halide and ar-lower alkanoyl halide. The reaction is conveniently either conducted in a conventional organic solvent such as dimethylformamide, pyridine, or the like; or, in the case wherein acid anhydride or diacyl sulfide is used as the acylating agent, said acid anhydride or diacyl sulfide can itself serve as the reaction medium. The reaction is, if desired, conducted at room temperature, but can be conducted at above or below room temperature.

In those cases wherein $R_1$ in Formula II is hydrogen, compounds of Formula I above, wherein $R_1$ and $R_3$ are the same acyl group, can be obtained. On the other hand, starting material compounds of Formula II above, wherein $R_1$ is already an acyl group can be reacted via the above procdure to yield compounds wherein $R_1$ remains unchanged and accordingly, $R_1$ and $R_3$ are the same or dissimilar acyl groups. Moreover, it has been found that by using dimethylformamide as the reaction medium, compounds of Formula II, wherein $R_1$ is hydrogen can be selectively acylated to yield compounds of Formula I wherein $R_1$ is hydrogen. Also, aroylation has been found to selectively occur at the 3-position and not to affect the 2-position nitrogen atom.

Compounds of Formula I above, wherein $R_3$ is hydrogen, can be prepared by hydrolysis of compounds of Formula I above wherein $R_3$ is lower alkanoyl, aroyl or ar-lower alkanoyl. Suitably the hydrolysis is effected in alkaline medium. The alkaline treatment is suitably effected at room temperature, though such is not critical and the hydrolysis can be conducted at higher or lower temperatures. However, of course, the temperature should not be so high as to cause decomposition of the desired end product. Said alkaline hydrolysis can suitably be effected in an aqueous medium containing an organic solvent such as dioxane, tetrahydrofuran or like organic solvents miscible with water.

Compounds of Formula I wherein $R_3$ is lower alkyl can be prepared from corresponding compounds of Formula I wherein $R_3$ is other than lower alkyl. Suitably, such a compound of Formula I is reacted with a lower alkanol of the formula $R_3$—OH, wherein $R_3$ is lower alkyl, to yield corresponding compounds of Formula I wherein $R_3$ is lower alkyl. Suitably, this reaction is effected by treating an acid addition salt, for example, a hydrohalide such as the hydrochloride, of a compound of Formula I wherein $R_3$ is hydrogen, lower alkanoyl, aroyl or ar-lower alkanoyl, with a lower alkanol. Alternatively, said compound of Formula I in base form or in the form of an acid addition salt can be treated with lower alkanol in the presence of an acid such as a hydrohalic acid, for example, hydrochloric acid. The treatment with lower alkanol can be effected using the lower alkanol itself as the solvent, or in the presence of an inert organic solvent. Also, the treatment can be effected in the presence or absence of water. The treatment can be effected at room temperature or elevated temperatures, but the latter are preferred. Advantageously, the reaction with lower alkanol is effected at reflux, for example, in the case of the lower molecular weight lower alkanols, between about 60° C. and about 80° C.

The compounds of Formula I above are useful as anticonvulsants. They are especially useful by virtue of their substantial lack of unwanted side effects. Said compounds or their pharmaceutically acceptable acid addition salts can be administered, with dosage adjusted to individual requirements, in conventional pharmaceutical dosage forms. For example, they can be administered internally, i.e. parenterally or enterally, in the form of tablets, suspensions, solutions, capsules, dragées, and the like.

The following examples are illustrative, but not limitative of the invention. All temperatures are in degrees centigrade.

*Example 1*

A solution of 31 g. of 7-chloro-2-methylamino-5-phenyl-3H-1,4-benzodiazepine 4-oxide in a mixture of 360 ml. of pyridine and 180 ml. of acetic anhydride was heated to 50° for 20 minutes, then left at room temperature for four days. The solution was concentrated in vacuo to a small volume, and the residue was treated with ether and petroleum ether, which caused the precipitation of crystals. The first fraction of crystals (19.1 g.) consisted of almost pure 7-chloro - 2 - (N-methylacetamido)-5-phenyl-3H-1,4-benzodiazepine 4-oxide. The second fraction obtained after the addition of more petroleum ether weighed 11.8 g. and melted below 140°. After recrystallization of this fraction form ether or a mixture of methylene chloride, ether and petroleum ether, 7-chloro-2-(N-methylacetamido) - 3 - acetoxy-5-phenyl-3H-1,4-benzodiazepine was obtained. The product is dimorphic and forms colorless prisms melting at 145–146° or at 159–160°.

*Example 2*

A solution of 10 g. of 7-chloro-2-(N-methylacetamido)-5-phenyl-3H-1,4-benzodiazepine 4-oxide in 25 ml. of acetic anhydride was heated for 10 minutes to 80°. The solution was concentrated in vacuo and the residue recrystallized from a mixture of acetone and petroleum ether. First 2.6 g. of unreacted starting material crystallized out and was removed. Then more petroleum ether was added, yielding crystals of 7-chloro-2-(N-methylacetamido)-3-acetoxy-5-phenyl - 3H - 1,4-benzodiazepine. The product was crystallized from ether or a mixture of methylene chloride, ether and petroleum ether. It is dimorphic and forms colorless prisms melting at 145–146° or at 159–160°.

*Analysis.*—Calcd. for $C_{20}H_{19}N_3O_3Cl$: C, 62.58; H, 4.73; O, 12.51; acetyl, 22.43. Found: C, 62.56; H, 4.47; O, 12.91; acetyl, 22.81.

*Example 3*

To a solution of 64 g. of 7-chloro-2-methylamino-5-phenyl-3H-1,4-benzodiazepine 4-oxide in 600 ml. of dimethylformide, 25.2 ml. of acetyl chloride was added with outside cooling. Crystals of 7-chloro-2-methylamino-3-acetoxy-5-phenyl-3H-1,4-benzodiazepine hydrochloride started to precipitate after a short time and were filtered off after about 1 hour. After recrystallization from a mixture of ethanol and petroleum ether the product formed colorless needles melting at 212–213°.

*Analysis.*—Calcd. for $C_{18}H_{16}N_3O_2Cl$: C, 57.15; H, 4.53. Found: C, 56.99; H, 4.80.

The above described 7-chloro-2-methylamino-3 acetoxy-5-phenyl-3H-1,4-benzodiazepine hydrochloride was treated with an excess of ice cold dilute sodium hydroxide, and the liberated base was extracted with methylene chloride. The methylene chloride layer was separated, dried, and concentrated in vacuo and the residue was crystallized from a mixture of methylene chloride and ether to yield colorless prisms of 7-chloro-2-methylamino-3-acetoxy-5-phenyl-3H-1,4-benzodiazepine melting at 202–203°.

*Analysis.*—Calcd. for $C_{18}H_{16}N_3O_2Cl$: C, 63.25; H, 4.72; N, 12.30; acetyl, 12.6. Found: C, 63.12; H, 4.77; N, 12.46, 12.47; acetyl, 12.94.

*Example 4*

A solution of 3.8 g. of 7-chloro-2-(N-methylacetamido)-3-acetoxy-5-phenyl-3H-1,4-benzodiazepine in 50 ml. of dioxane was treated with 10 ml. of 1 N sodium hydroxide. After 1½ hours standing at room temperature, the mixture was concentrated in vacuo to a small volume and diluted with water and ether. The ether layer was separated, dried, concentrated to a small volume, and the precipitated crystals were filtered off. Thus, colorless prisms were obtained which after recrystallization from acetone were identical with an original sample of 7-chloro-2-methylamino-3-acetoxy - 5 - phenyl-3H-1,4-benzodiazepine.

*Example 5*

A solution of 1 g. of 7-chloro-2-methylamino-5-phenyl-3H-1,4-benzodiazepine-3-ol in a mixture of 10 ml. of pyridine and 5 ml. of acetic anhydride was left at room temperature for 16 hours, concentrated in vacuo to dryness and the residue recrystallized from a mixture of acetone and petroleum ether yielding colorless prisms of 7-chloro-2-methylamino-3-acetoxy-5-phenyl-3H - 1,4 - benzodiazepine.

*Example 6*

A solution of 3.4 g. of 7-chloro-2-methylamino-3-acetoxy-5-phenyl-3H-1,4-benzodiazepine in a mixture of 50 ml. of dioxane and 10 ml. of 1 N sodium hydroxide was stirred at room temperature for 4 hours and then concentrated in vacuo to a small volume. Water was added and the reaction product was extracted with methylene chloride. The organic layer was dried, concentrated in vacuo and the residual oil was crystallized from ether. After recrystallization from a mixture of methylene chloride and petroleum, ether, colorless needles of 7-chloro-2-methylamino - 5 - phenyl-3H-1,4-benzodiazepin-3-ol melting at 184–186° were obtained.

*Analysis.*—Calcd. for $C_{16}H_{14}ClN_3O$: C, 64.11; H, 4.71; N, 14.02. Found: C, 64.11; H, 4.98; N, 13.58.

*Example 7*

To a solution of 1.9 g. of 7-chloro-2-(N-methylacetamido)-3-acetoxy-5-phenyl-3H-1,4-benzodiazepine in 50 ml. of dioxane was added 10 ml. of 1 N sodium hydroxide. The mixture was stirred at room temperature for 20 hours and then concentrated in vacuo. The residue was dissolved in methylene chloride, washed with water, the organic layer was separated, dried, and concentrated in vacuo. The residue was crystallized from methylene chloride yielding colorless needles of 7-chloro-2- methylamino-5-phenyl-3H-1,4-benzodiazepin-3-ol.

Example 8

To a solution of 12 g. of 7-chloro-2-methylamino-5-phenyl-3H-1,4-benzodiazepine 4-oxide in 100 ml. of dimethylformamide was added 5.5 g. of propionyl chloride. The solution was cooled, left at room temperature for 1 hour and then diluted with ice water and dilute sodium hydroxide. The mixture was then extracted with methylene chloride, the organic layer washed with dilute hydrochloric acid and water, dried and concentrated in vacuo. The residual oil was crystallized from ether or from a mixture of ether and petroleum ether yielding colorless prisms of 3-propionyloxy-7-chloro-2-methylamino-5-phenyl-3H-1,4-benzodiazepine melting at 197–198°.

Analysis.—Calcd. for $C_{19}H_{18}ClN_3O_2$: C, 64.12; H, 5.10; N, 11.81. Found: C, 64.15; H, 5.38; N, 11.70, 11.71.

Example 9

To a solution of 12 g. of 7-chloro-2-methylamino-5-phenyl-3H-1,4-benzodiazepine 4-oxide in 100 ml. of dimethylformamide was added 6 ml. of butyryl chloride. The solution was left at room temperature for 16 hours, then diluted with ice water and extracted with methylene chloride. The organic layer was washed with dilute sodium hydroxide and water, dried and concentrated in vacuo. To the residue, ether was added yielding colorless crystals of 3-butyryloxy-7-chloro-2-methylamino-5-phenyl-3H-1,4-benzodiazepine melting at 174–175°.

Example 10

To a solution of 6 g. of 7-chloro-2-methylamino-5-phenyl-3H-1,4-benzodiazepine 4-oxide hydrochloride in 25 ml. of pyridine, 2.7 g. of isovaleryl chloride was added. The mixture was left at room temperature for 16 hours and then concentrated in vacuo. The residue was dissolved in methylene chloride, washed with dilute ice cold hydrochloric acid, then sodium carbonate solution and water. The organic layer was separated, dried and concentrated in vacuo. The residue was crystallized from a mixture of ether and petroleum ether yielding colorless prisms of 3-isovaleryloxy-7-chloro-2-methylamino-5-phenyl-3H-1,4-benzodiazepine melting at 132–133°.

Analysis.—Calcd. for $C_{21}H_{22}ClN_3O_2$: C, 65.70; H, 5.78. Found: C, 66.50; H, 5.91.

Example 11

To a solution of 7-chloro-2-methylamino-5-phenyl-3H-1,4-benzodiazepine 4-oxide in 100 ml. of dimethylformamide was added 5 ml. of benzoyl chloride. The mixture was left at room temperature for three days, then ice water was added and the reaction product extracted with methylene chloride. The organic solution was separated, dried and concentrated in vacuo. To the residual oil, ether was added and the precipitated crystals of 3-benzoyloxy-7-chloro-2-methylamino-5-phenyl-3H-1,4-benzodiazepine were filtered off. After recrystallization from acetone the product formed prisms melting at 215–216°.

The same product was obtained by benzoylation of 7-chloro-2-methylamino-5-phenyl-3H-1,4-benzodiazepine 4-oxide in pyridine solution.

Example 12

To a solution of 10 millimols of 2-methylamino-5-phenyl-7-trifluoromethyl-3H-1,4-benzodiazepine 4-oxide in 20 ml. of dimethylformamide, 15 millimols of acetyl chloride were added while stirring. The solution was permitted to stand for one hour at room temperature. At the end of this period, the solvent was distilled off at below 35° in vacuo. The residue was then refluxed with acetone, chilled and filtered to give 3-acetoxy-2-methylamino-5-phenyl-7-trifluoromethyl-3H-1,4-benzodiazepine hydrochloride which upon two recrystallizations from acetonitrile formed colorless needles melting at 206–207°.

Calc. for $C_{19}H_{16}F_3N_3O_2 \cdot HCl$: C, 55.41; H, 4.16; N, 10.20. Found: C, 55.67; H, 4.36; N, 10.53.

700 mg. of 3-acetoxy-2-methylamino-5-phenyl-7-trifluoromethyl-3H-1,4-benzodiazepine hydrochloride was partitioned between chloroform and dilute sodium carbonate. The organic layer was washed with water, dried over sodium sulate, filtered and concentrated to dryness in vacuo. The residue was crystallized from a mixture of benzene and hexane yielding 3-acetoxy-2-methylamino-5-phenyl-7-trifluoromethyl-3H-1,4-benzodiazepine which crystallized as heavy colorless prisms; M.P. 211–212°. Further recrystallization did not alter the melting point.

Analysis.—Calcd. for $C_{19}H_{16}F_3N_3O_2$: N, 11.20. Found, N, 11.04.

The above-mentioned 2-methylamino-5-phenyl-7-trifluoromethyl-3H-1,4-benzodiazepine 4-oxide, its preparation and intermediates therefor, are not a part of this invention, but such are disclosed hereinbelow in order that the present disclosure may be complete.

80 g. of sodium nitrite were added slowly with stirring to 460 ml. of concentrated sulfuric acid. After heating to 70°, a clear solution was obtained. This solution was cooled and 200 g. of 2-chloro-5-trifluoromethylaniline were slowly added at a temperature between 10 and 20°. The reaction mixture was stirred for one hour at 20° and then poured onto a mixture of 200 g. of sodium chloride and 1.6 kg. of ice. Excess sodium chloride was filtered off. A solution of 280 g. of zinc chloride in 300 ml. of water was added to the filtrate whereupon a zinc chloride double salt of the corresponding diazonium compound precipitated. After standing overnight at 0°, the double salt was filtered off and washed with a cold saturated salt solution.

To a solution of 120 g. of sodium cyanide and 72 g. of cuprous cyanide in 300 ml. of water were added with stirring and cooling with ice, 291 g. of the wet zinc chloride double salt. After the addition of 24 g. of sodium carbonate, the mixture was first stirred for one hour at 20° and then at 70° for an additional ½ hour. The reaction mixture was cooled and extracted with ether to obtain crude 2-chloro-5-trifluoromethylbenzonitrile. The product was purified by steam distillation and crystallization of the organic part of the distillate from hexane to give the pure compound, M.P. 39–40°.

To a solution of phenyl magnesium bromide, prepared from 9.5 g. of magnesium, 58.5 g. of bromobenzene and 500 ml. of anhydrous ether, was added with stirring a solution of 39 g. of 2-chloro-5-trifluoromethylbenzonitrile in 200 ml. of benzene. 400 ml. of solvent were distilled off and the reaction mixture was then refluxed for 16 hours. The Grignard complex was decomposed with 40 g. of ammonium chloride and 200 g. of ice. The mixture was then extracted with benzene. 2-chloro-5-trifluoromethylbenzophenone imine hydrochloride was precipitated from the benzene solution by the addition of 40 ml. of concentrated hydrochloric acid. The product was filtered off, washed with benzene and dried in vacuo, M.P. 248–251°, and upon further purification melted at 250–262°.

60 g. of 2-chloro-5-trifluoromethylbenzophenone imine hydrochloride were refluxed overnight with a mixture of 300 ml. of toluene and 300 ml. of 25% sulfuric acid while stirring. The toluene layer was separated, washed with water, dried, concentrated in vacuo and the residue crystallized from hexane to yield pure 2-chloro-5-trifluoromethylbenzophenone, M.P. 39–40° (corr.).

50 g. of 2-chloro-5-trifluoromethylbenzophenone and 500 ml. of concentrated aqueous ammonia were reacted in a closed vessel for 10 hours at 140° in the presence of 10 g. of cuprous chloride catalyst. The reaction product was extracted with ether. The ether extract was concentrated in vacuo, and the residue dissolved in hexane and purified by chromatography using a 10 fold amount of neutral alumina (Brockmann activity state II). Elution with a hexane-ether mixture (1:1) and evaporation of the solvent gave 2-amino-5-trifluoromethylbenzophenone which was recrystallized from hexane to give yellow crystals, M.P. 81–82° (corr.).

13.3 g. of 2-amino-5-trifluoromethylbenzophenone in 60 ml. of ethanol were refluxed for 24 hours with 6 g. of hydroxylamine hydrochloride. The reaction mixture was adjusted to about pH 6 by the addition of a solution of 12 g. of sodium acetate in 100 ml. of water. The mixture was then extracted with ether to yield an oil which, after repeated crystallization from a mixture of ether and hexane, gave 2 - amino - 5 - trifluoromethylbenzophenone oxime melting at 175–177°, which upon further crystallization melted at 182–183° (corr.).

2.8 g. of the 2-amino-5-trifluoromethylbenzophenone oxime obtained above were dissolved in 15 ml. of acetic acid and, after addition of 1.5 ml. of chloroacetyl chloride, kept for one hour at 20°, then for two hours at 70°. The mixture was diluted with ether and washed with water. The ether solution was concentrated in vacuo and gave a solid residue which was crystallized from methylene chloride-ether to yield pure, yellow 2-chloromethyl-4 - phenyl - 6 - trifluoromethylquinazoline 3-oxide, M.P. 149–150°.

500 mg. of 2-chloromethyl-4-phenyl-6-trifluoromethylquinazoline 3-oxide were reacted for 5 hours at 25° with 10 ml. of a 40% solution of methylamine in methanol. The reaction mixture was diluted with water, then extracted with ether. The ether solution was concentrated in vacuo and the residual crude, 7-trifluoromethyl-2-methylamino-5-phenyl-3H-1,4-benzodiazepine 4-oxide, was purified by crystallization from ether-hexane to yield colorless crystals melting at 257–258°, which upon recrystallization melted at 264–265°.

Example 13

To a solution of 100 mg. of 2-methylamino-7-nitro-5-phenyl-3H-1,4-benzodiazepine 4-oxide in 5 ml. of dimethylformamide, 0.5 cc. of acetyl chloride was added. After stirring for one hour at room temperature, the reaction mixture was concentrated to dryness in vacuo. The residue was dissolved in acetone and precipitated with anhydrous ether to give 85 mg. of crude 3-acetoxy-2-methylamino - 7 - nitro-5-phenyl-3H-1,4-benzodiazepine hydrochloride. This was then partitioned between chloroform and dilute sodium hydroxide. The organic layer was washed twice with water, dried over sodium sulfate, filtered, and concentrated to dryness in vacuo. The residue was crystallized from a mixture of benzene and hexane to give 3-acetoxy-2-methylamino-7-nitro-5-phenyl-3H-1,4-benzodiazepine, M.P. 210–212°, which crystallized as clusters of yellow rectangular plates.

The above mentioned 7-nitro-2-methylamino-5-phenyl-3H-14-benzadiazepine 4-oxide, its preparation and intermediates therefore, are not a part of this invention, but such are disclosed hereinbelow in order that the present disclosure may be complete.

A mixture of 72 g. of 2-amino-5-nitrobenzophenone, 34 g. of hydroxylamine hydrochloride, 90 g. of powdered potassium hydroxide, 500 cc. of alcohol and 25 cc. of water was refluxed on a steam bath with stirring for 15 minutes. It was then cooled to room temperature and poured into a solution of 160 cc. of concentrated hydrogen chloride in 1000 cc. of water. The suspension of the precipitated crude product was cooled in ice and then filtered off, washed acid-free with ice water, and sucked dry, and crystallized from ethanol in needles, giving 2-amino-5-nitrobenzophenone oxime, M.P.=203–205°.

To a suspension of 10 g. of 2-amino-5-nitrobenzophenone oxime in 100 cc. of acetic acid, warmed to 50–60°, 6 cc. of chloracetyl chloride was added in small portions, with stirring. The resulting brown solution was stirred at 50–60° for 3 hours and then allowed to stand at room temperature overnight. The reaction mixture was then saturated with hydrogen chloride and concentrated in vacuo. The residue was dissolved in 200 cc. of warm methylene chloride and was then cooled to 0°. 50 g. of crushed ice was added to the reaction mixture, then 30 cc. of 1 N sodium hydroxide dropwise until a pH of 8–9 was reached. The mixture was transferred to a separatory funnel and 150 cc water were added. The organic phase was separated and dried over sodium sulfate. The methylene chloride solution was treated with activated charcoal, filtered, and evaporated to dryness in vacuo to give a yellow crystalline residue. The crude product was purified by refluxing in a mixture of 200 cc. of acetone and 100 cc. of methylene chloride with 15 g. of activated charcoal. 2-chloro-methyl-4-phenyl-6-nitroquinazoline 3-oxide crystallized in yellow prisms on cooling of the filtered mixture. M.P.=205–207°.

6.0 g. of 2-chloromethyl-4-phenyl-6-nitroquinazoline 3-oxide was added in portions to 150 cc. of a 25 percent solution of methylamine in methanol at 5° with cooling and stirring. After a few minutes, a yellow crystalline substance started to separate. The reaction mixture was stirred at room temperature for 24 hours then allowed to stand for another 24 hours. The yellow product was filtered off, washed with a little methanol, sucked dry, and crystallized in needles from ether-methanol giving 7-nitro-2 - methylamino - 5 - phenyl - 3H - 1,4 - benzodiazepine 4-oxide, which melted at 260–261° (dec.).

Example 14

To a solution of 6.9 g. of 3-acetoxy-2-methylamino-5-phenyl - 7 - trifluoromethyl - 3H - 1,4 - benzodiazepine hydrochloride in 150 ml. of ethanol at 50°, 25 ml. of 2 N sodium hydroxide was added and the mixture stirred for 20 minutes at 40–50°. After cooling and dilution with 150 ml. of water, 16.7 ml. of 1 N hydrochloric acid was added. The solution was then extracted with chloroform. The chloroform layer was washed with water, dried over sodium sulfate, filtered and concentrated to dryness in vacuo. On warming the residue with hexane, the product 2-methylamino - 5 - phenyl - 7 - trifluoromethyl - 3H - 1,4 - benzodiazepin-3-ol crystallized; M.P. 177–178° (dec.). Recrystallization from a mixture of benzene and hexane gave clusters of colorless rods of unchanged melting point.

Example 15

A solution of 2.0 g. of 3 - acetoxy - 2 - methylamino - 7-nitro-5-phenyl-3H-1,4-benzodiazepine in 100 ml. of ethanol containing 5 ml. of 22 percent hydrogen chloride in ethanol was heated to reflux for 5 minutes. After concentration to a small volume in vacuo, the residue was partitioned between chloroform and dilute sodium carbonate. The organic layer was washed with water, dried over sodium sulfate, filtered and the solvent distilled off in vacuo. The residue was recrystallized from a mixture of acetone and hexane to give yellow prisms of 3-ethoxy-2-methylamino-7-nitro-5-phenyl-3H-1,4-benzodiazepine. Recrystallization from a mixture of tetrahydrofuran and hexane gave a purified product melting at 222–223°.

Example 16

To a solution of 2.3 g. of 7-chloro-2-methylamino-5-(4-methoxyphenyl)-3H-1,4-benzodiazepine 4-oxide in 25 ml. of dimethylformamide at room temperature, 1 ml. of acetyl chloride was added. The temperature rose about 6°. After stirring for 1 hour, the solvent was distilled off in vacuo and the residue partitioned between chloroform and dilute sodium carbonate. The chloroform layer was washed with water and dried over sodium sulfate. The residue obtained after filtration and distillation of solvent was crystallized from acetonitrile to give 3-acetoxy-7-chloro - 2 - methylamino - 5 - (4 - methoxyphenyl) - 3H-1,4-benzodiazepine which upon recrystallization from a mixture of tetrahydrofuran and hexane gave a pure product melting at 202–203°.

Example 17

Ammonia gas was passed into a stirred suspension of 3.75 g. of the acetyl ester of 3-acetoxy-2-methylamino-7-nitro-5-phenyl-3H-1,4-benzodiazepine in 250 ml. of ethanol for 2 hours. After 15 minutes a clear solution had formed. The reaction mixture was kept overnight at room temperature and the solvent was then distilled in vacuo. The residue was dissolved in 100 ml. of acetone and decolorized by heating with about 2 gms. of activated charcoal (Norite A). The pale yellow solution was concentrated to dryness in vacuo and the residue crystallized from a mixture of methylene chloride and hexane to give crude 2 - methylamino - 7 - nitro - 5 - phenyl - 3H - 1,4-benzodiazepin-3-ol which upon recrystallization from acetonitrile gave yellow plates melting at 163–164°.

We claim:
1. A compound selected from the group consisting of compounds of the formula

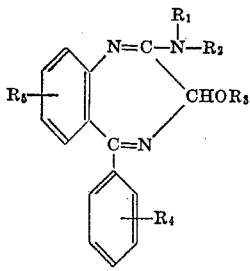

and their pharmaceutically acceptable salts,
wherein $R_1$ is selected from the group consisting of hydrogen and lower alkanoyl; $R_2$ is selected from the group consisting of hydrogen and lower alkyl; $R_3$ is selected from the group consisting of hydrogen, lower alkyl, lower alkanoyl, and benzoyl; $R_4$ is selected from the group consisting of hydrogen, halogen, lower alkoxy and trifluoromethyl; $R_5$ is selected from the group consisting of hydrogen, halogen, trifluoromethyl, nitro, lower alkylthio and lower alkyl.

2. 7-halo-2-lower alkylamino-5-phenyl-3-lower alkanoyloxy-3H-1,4-benzodiazepine.
3. 7 - halo - 2 - lower alkylamino - 3 - hydroxy - 5-phenyl-3H-1,4-benzodiazepine.
4. 7 - trifluoromethyl - 2 - lower alkylamino - 5 - phenyl-3-lower alkanoyloxy-3H-1,4-benzodiazepine.
5. 7 - chloro - 2 - methylamino - 5 - phenyl - 3 - hydroxy-3H-1,4-benzodiazepine.
6. 7 - trifluoromethyl - 2 - methylamino - 5 - phenyl-3-hydroxy-3H-1,4-benzodiazepine.
7. A compound selected from the group consisting of a compound of the formula

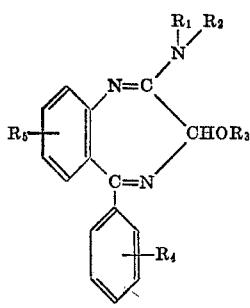

and the pharmaceutically acceptable salts thereof wherein $R_1$ is selected from the group consisting of hydrogen and lower alkanoyl; $R_2$ is selected from the group consisting of hydrogen and lower alkyl; $R_3$ is selected from the group consisting of hydrogen, lower alkanoyl, and benzoyl; $R_4$ is selected from the group consisting of hydrogen, chlorine, fluorine, methoxy, and trifluoromethyl, and $R_5$ is selected from the group consisting of hydrogen, chlorine, bromine, trifluoromethyl, and nitro.

8. A method which comprises reacting a compound of the formula

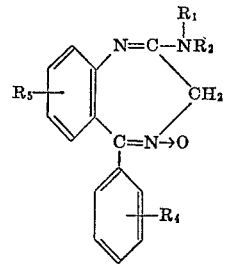

wherein
$R_1$ is selected from the group consisting of hydrogen and lower alkanoyl, $R_2$ is selected from the group consisting of hydrogen and lower alkyl, $R_4$ is selected from the group consisting of hydrogen, chlorine, fluorine, methoxy and trifluoromethyl and $R_5$ is selected from the group consisting of hydrogen, chlorine, bromine, trifluoromethyl and nitro
with an acylating agent selected from the group consisting of lower alkanoyl anhydride, benzoyl anhydride, lower alkanoyl halide and benzoyl halide and recovering compounds having the formula

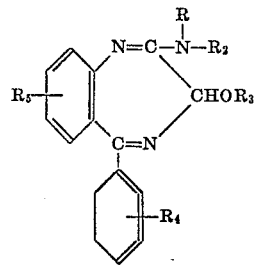

wherein
$R_1$ is selected from the group consisting of hydrogen and lower alkanoyl, $R_3$ is selected from the group consisting of lower alkanoyl and benzoyl and $R_2$, $R_4$ and $R_5$ have the same meaning as above.

References Cited
UNITED STATES PATENTS 3,051,701  8/1962  Reeder et al. _____ 260—239

OTHER REFERENCES

Klingsberg: Pyridine and Derivatives, Part Two (New York, 1961), pp. 125–128.

Culvenor: Reviews Pure and Applied Chem., vol. 3, pp. 105–109 (1953).

ALTON D. ROLLINS, *Primary Examiner.*

JOHN D. RANDOLPH, NICHOLAS S. RIZZO, ALEX MAZEL, *Examiners.*

UNITED STATES PATENT OFFICE
CERTIFICATE OF CORRECTION

Patent No. 3,374,225            March 19, 1968

Earl Reeder et al.

It is certified that error appears in the above identified patent and that said Letters Patent are hereby corrected as shown below:

Column 10, lines 33 to 43, the formula should appear as shown below:

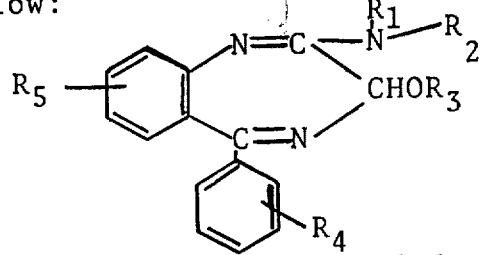

Signed and sealed this 23rd day of September 1969.

(SEAL)

Attest:

Edward M. Fletcher, Jr.            WILLIAM E. SCHUYLER, JR.

Attesting Officer            Commissioner of Patents